July 17, 1962

F. W. BERRY 3,044,217

SPACER MEMBERS FOR THE REINFORCEMENT
OF REINFORCED CONCRETE STRUCTURES
Filed Aug. 25, 1958

INVENTOR
Ferdinand William Berry
BY
W. B. Harpman
ATTORNEY

United States Patent Office 3,044,217
Patented July 17, 1962

3,044,217
SPACER MEMBERS FOR THE REINFORCEMENT OF REINFORCED CONCRETE STRUCTURES
Ferdinand William Berry, "Latchetts," 108 Woodland Drive, Hove 4, England
Filed Aug. 25, 1958, Ser. No. 756,983
1 Claim. (Cl. 50—514)

It is known to provide spacers, for use in spacing the reinforcement elements of reinforced concrete structures away from the shuttering or mould, and from other reinforcement elements of the structure.

It has previously been proposed in my co-pending British application No. 11,864/55 dated 25th April, 1955 to utilise as such spacers a disc or the like of concrete or other material which will not corrode, said disc or the like to be engaged on to the reinforcement whereafter securing means can be incorporated in the disc or the like to engage against the reinforcement and retain the disc or the like on the reinforcement.

The object of the present invention is to provide an improved construction of spacer, of the radial entry type, wherein the disc or the like and releasable securing means for retaining the disc or the like on the reinforcement are of a particularly simple and convenient nature so far as both manufacture and operation are concerned.

According to the present invention, a spacer for the use in spacing the reinforcement of reinforced concrete comprises a disc or the like, of suitable material such as concrete, having a slot extending from its periphery to a point in the region of the centre thereof and capable of receiving the reinforcement, and a resiliently deformable catch element pivotable about an axis remote from and parallel to the axis of the disc or the like, said catch element being movable, by pivoting, in the slot so as to have a relatively less-deformed rest position in which it abuts against the slot and bears on the reinforcement, thereby retaining the disc or the like on the reinforcement.

The catch element advantageously locates, in the engaged position, into a groove or recess or against a shoulder of the disc or the like, thereby to provide a positive lock as opposed to a merely spring-loaded location.

Conveniently, the catch element is provided with a handle portion protruding in suitable manner for easy manipulation by the hand.

In a preferred form, the catch element includes a journal or journals engaged into a hole formed in the disc or the like at one or both sides.

The catch element may consist of or comprise spring wire to provide the resilience required and to ensure that the spacer is held securely upon the reinforcement even when subjected to vibration such as may be used to compact the concrete.

Alternatively a catch element may be provided which is of a resilient plastic or synthetic material or of natural or synthetic rubber and which may be suitably located to ensure that the spacer is held securely in a desired position upon the reinforcement.

In order that the nature of the invention may be readily ascertained, some embodiments of spacer in accordance therewith are hereinafter particularly described, by way of example only with reference to the accompanying diagrammatic drawings in which.

Figure 1:
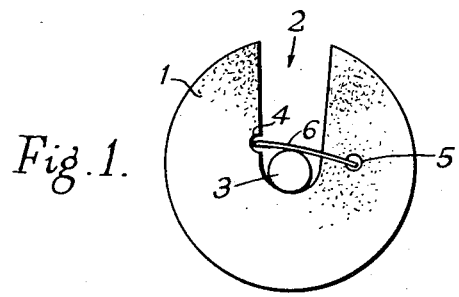
FIG. 1 is a plan view of a spacer according to the invention.
Figure 2:
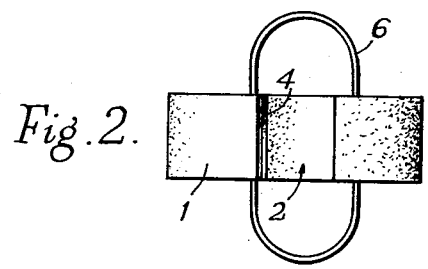
FIG. 2 is a side elevation.
Figure 3:
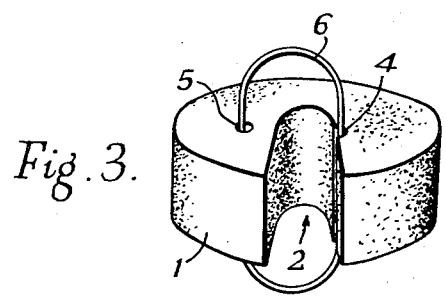
FIG. 3 is a perspective view of the spacer shown in FIG. 1.

The spacer is a simple disc 1 of concrete or other non-corrodible bindable material formed with a radial slot 2 extending from the periphery to the centre of the disc. The walls of the slot may be parallel, or else they may be tapered as shown in the drawings so that the slot is wider at the periphery of the disc than at the centre. The minimum separation between the walls of the slot should be such to provide any easy clearance fit for the reinforcement bar 3 with which they are to be used. One wall of the slot has a catch groove or formation 4 formed therein at a point approximating to the position of the periphery of the reinforcement 3 when this is fully seated in the slot. Alternatively, instead of this catch groove 4, a recess of other form or a shoulder may be provided upon the same wall of the slot. In the body of the disc on the side of the slot remote from the catch groove, there is provided a bore 5 extending the whole or part of the way through the disc, the axis of this hole preferably being parallel to the axis of the disc.

A catch element 6 for the spacer comprises a length of springy wire which is bent into an elliptical form, one of the longer sides of the ellipse being located within the bore hole 5. Conveniently, the ends of the elliptical wire loop may be located within the hole 5. When the catch element is in a locking position (as shown in the drawings), the longer side of the ellipse opposite the longer side which is located in the bore hole is seated in the catch groove or recess or against the shoulder upon the slot wall and engages this, the resiliency of the wire serving to prevent the catch element being displaced. The end curved portions of the catch element then bear against and frictionally engage the reinforcement to prevent the spacer moving longitudinally of the reinforcement and to positively lock the disc against radial movement which would allow it to become detached from the reinforcement. When the catch element is released by being manually sprung out of the groove or recess or over the shoulder, it is free to move until the free longer side thereof lies either against the side wall of the slot or is moved right out of the slot. The spacer may then be engaged upon the reinforcement and is free to move longitudinally thereof.

An alternative form of catch element which may be used if preferred comprises a length of springy wire bent into the shape of a J. The short arm of the J may then be engaged within the bore hole 5 whilst the bottom loop engages the reinforcing element and the longer arm sits within the recess or catch groove or engages against the shoulder. If desired, the free end of the longer arm may be provided with a loop or a cross bar or a piece of wire bent at an angle to provide a simple handle by means of which the catch element can be manipulated when this is being moved into or out of position. In this case, the width of the slot can either be such as to allow the free passage of the reinforcement over the catch element when the latter is in the released position, or the catch element may completely be removed to clear the slot to allow the reinforcement to pass into this.

Such a construction requiring only a disc formed with a radial slot therein and with a groove, recess or shoulder upon one wall of the slot and a blind hole or bore through the disc provides a spacer, the production of which is very much simplified. In addition, the catch elements are very easily made and can be readily inserted at the time of use.

Whilst a particular embodiment has been described it will be understood that various modifications may be made without departing from the scope of the invention.

What I claim is:

A spacer for use in spacing the reinforcements of reinforced concrete with respect to the forms therefor, comprising a relatively thick disc having a slot, for receiving a reinforcement, extending from its periphery to a point in the region of the center thereof and also having an aperture through the disc at one side of the slot and substantially parallel to the axis of the disc, a catch formation in the wall of said slot remote from said aperture, and a resiliently deformable catch element made from springy wire substantially in the shape of an ellipse, one of the longer sides of the ellipse extending through and being pivotally engaged within said aperture while the other longer side of the ellipse is so spaced from said one longer side that it resiliently engages said catch formation when the catch element is pivoted in the aperture to move said other longer side into said slot to hold the catch element in a closed position with the shorter sides thereof spaced diametrically from the inner end of the reinforcement-receiving slot by a distance less than the width of the slot.

References Cited in the file of this patent

UNITED STATES PATENTS

| | | |
|---|---|---|
| 191,472 | Robinson et al. | May 29, 1877 |
| 629,977 | Barber | Aug. 1, 1899 |
| 755,063 | Shockey | Mar. 22, 1904 |
| 1,361,558 | White | Dec. 7, 1920 |
| 1,835,632 | Buhrke | Dec. 8, 1931 |
| 2,260,974 | Healey et al. | Oct. 28, 1941 |

FOREIGN PATENTS

| | | |
|---|---|---|
| 1,022,799 | France | Dec. 17, 1952 |
| 688,989 | Great Britain | 1953 |